United States Patent [19]

Takayama

[11] Patent Number: 5,615,062
[45] Date of Patent: Mar. 25, 1997

[54] ROTARY HEAD TYPE RECORDING APPARATUS

[75] Inventor: Nobutoshi Takayama, Kanagawa-ken, Japan

[73] Assignee: Canon Kabushiki Kaisha, Tokyo, Japan

[21] Appl. No.: 488,953

[22] Filed: Jun. 7, 1995

Related U.S. Application Data

[63] Continuation of Ser. No. 172,858, Dec. 23, 1993, abandoned, and a division of Ser. No. 586,700, Sep. 24, 1990, Pat. No. 5,285,329.

[30] Foreign Application Priority Data

Sep. 29, 1989 [JP] Japan .................................. 1-255528
Sep. 29, 1989 [JP] Japan .................................. 1-255529
Sep. 29, 1989 [JP] Japan .................................. 1-255530

[51] Int. Cl.⁶ ............................ G11B 15/14; G11B 15/48
[52] U.S. Cl. .......................................... 360/64; 360/74.4
[58] Field of Search .......................... 360/4.1, 4.2, 70, 360/71, 10.1, 10.2, 72.1, 72.2, 72.3, 64, 74.4

[56] References Cited

U.S. PATENT DOCUMENTS 4,488,185  12/1984  Toba ........................................ 360/14.1
4,633,335  12/1986  Yamamoto et al. ....................... 360/9.1
4,786,981  11/1988  Sekimoto et al. ....................... 360/10.3
4,788,610  11/1988  Arata ........................................ 360/737
4,849,831   7/1989  Hino ......................................... 360/14.1

FOREIGN PATENT DOCUMENTS 0191303  4/1989  Japan.

Primary Examiner—W. C. Kim
Attorney, Agent, or Firm—Robin, Blecker, Daley & Driscoll

[57] ABSTRACT

A rotary head type recording apparatus comprises a rotary head which is arranged to record signals on a tape-shaped recording medium by tracing the medium; a transport device for longitudinally moving the tape-shaped recording medium; a recording circuit which is arranged to cause a recording signal to be recorded on the recording medium by supplying the recording signal to the rotary head; a recording control circuit which controls the start and stop of signal recording by the recording circuit; and a transport control circuit which controls the start and stop of the recording medium moving action of the transport device. The operation timing of the recording control circuit is arranged to be substantially identical to that of the transport control circuit.

19 Claims, 6 Drawing Sheets

ROTARY HEAD TYPE RECORDING APPARATUS

This is a continuation application under 37 CFR 1.62 of prior application Ser. No. 08/172,858, filed Dec. 23, 1993, abandoned, which is a divisional of Ser. No. 07/586,700, filed Sep. 24, 1990, now U.S. Pat. No. 5,285,329.

BACKGROUND OF THE INVENTION

1. Field of the Invention

This invention relates to a rotary head type recording apparatus and more particularly to an apparatus of the kind recording signals on a tape-shaped recording medium with a rotary head while the tape-shaped recording medium is transported.

2. Description of the Related Art

The apparatuses of the above-stated kind include the video tape recorder (hereinafter referred to as a VTR). Generally, the VTR is arranged to have a so-called joined shooting function by which a joint at every cut can be made inconspicuous on a reproduced picture when a picture taken, for example, by a video camera is to be recorded by the VTR. FIG. 1(a) of the accompanying drawings schematically shows how the tape is moved by the conventional joined shooting method. In accordance with the typical conventional method, the tape is first shifted from a recording state (indicated by a double line) to a recording pause state. In this instance, the tape is rewound to a given degree from its pause position and is then kept in a standby state while a pinch roller is left in a state of being pushed against a capstan. When a recording button is pushed after that, the VTR is put into a reproducing mode for a period of time corresponding to a degree to which the tape has been rewound. Tracking control is then performed before the VTR is brought back to the recording state.

With the joined shooting action performed in the above-stated manner, the tape is moved to a recording start position under tracking control performed for the recorded tracks. Therefore, any disorder in a tracking pattern at the joint part can be minimized by the above-stated method.

However, the conventional joined shooting method necessitates inclusion of rewinding and reproducing periods of time. Therefore, there occurs unrecordable time of at least four second or thereabout. During this period of time, the VTR is incapable of recording even while the video camera is picking up an-image for recording during this period.

Further, when the VTR shifts from its reproducing mode to its recording mode in accordance with the conventional method, a new recorded track might happen to overlap an existing recorded track in the attempt of leaving no unrecorded part there. Then, a part of the existing recorded track would be erased and missed from a reproduced picture.

In addition to these problems, the conventional method has presented the following problems: The length of time intervals of a so-called interval recording mode in which recording is to be repeated for every given period of time cannot be shortened beyond a certain limited degree due to the above-stated problems. The consumption of electric energy would be increased by the frequent pauses and restarts of recording.

In performing the joined shooting action, the recording is in some Oases not performed over a long period of time and in other cases frequently pauses and restarts as mentioned above. The conventional method encounters various problems particularly in the latter cases.

SUMMARY OF THE INVENTION

A general object of this invention is to solve the above-stated problems. It is a more specific object of the invention to provide a rotary head type recording apparatus which is capable of shortening a period of time required between a pause and a restart of recording without disturbing a track pattern at a joint part between records.

Under this object, a rotary head type recording apparatus arranged as an embodiment of the invention comprises: a rotary head which is arranged to record signals on a tape-shaped recording medium by tracing the medium; transport means for transporting the tape-shaped recording medium in the longitudinal direction thereof; recording means for causing a recording signal to be recorded on the recording medium by supplying the recording signal to the rotary head; recording control means for controlling a start and a stop of signal recording by the recording means; and transport control means for controlling a start and a stop of the tape-shaped recording medium transporting action of the transport means, the operation timing of the recording control means being arranged to be substantially identical to that of the transport control means.

It is another object of the invention to provide a rotary head type recording apparatus which is capable of suitably selecting the operation mode thereof for a period of time between a pause and a restart of recording according to the operating condition of the apparatus, so that the operation of the apparatus can be adequately performed under any condition.

Under that object, a rotary head type recording apparatus arranged as an embodiment of the invention comprises: a rotary head which is arranged to record signals on a tape-shaped recording medium by tracing the medium; transport means for transporting the tape-shaped recording medium in the longitudinal direction thereof; recording means for causing a recording signal to be recorded on the recording medium by supplying the recording signal to the rotary head; and control means for controlling the transport means and the recording means, the control means having a first control mode in which the tape-shaped recording medium transporting action of the transport means is caused to stop and start accordingly as the recording signal recording action of the recording means stops and starts and a second control mode in which the tape-shaped recording medium transporting direction of the transport means is reversed accordingly as the recording signal recording action of the recording means stops and the recording means is caused to begin to record after the lapse of a predetermined period of time from a start of the recording medium transporting action of the transport means.

The above and other objects and features of the invention will become apparent from the following detailed description of an embodiment thereof taken in conjunction with the accompanying drawings.

DETAILED DESCRIPTION OF THE PREFERRED EMBODIMENT

Figure 2:
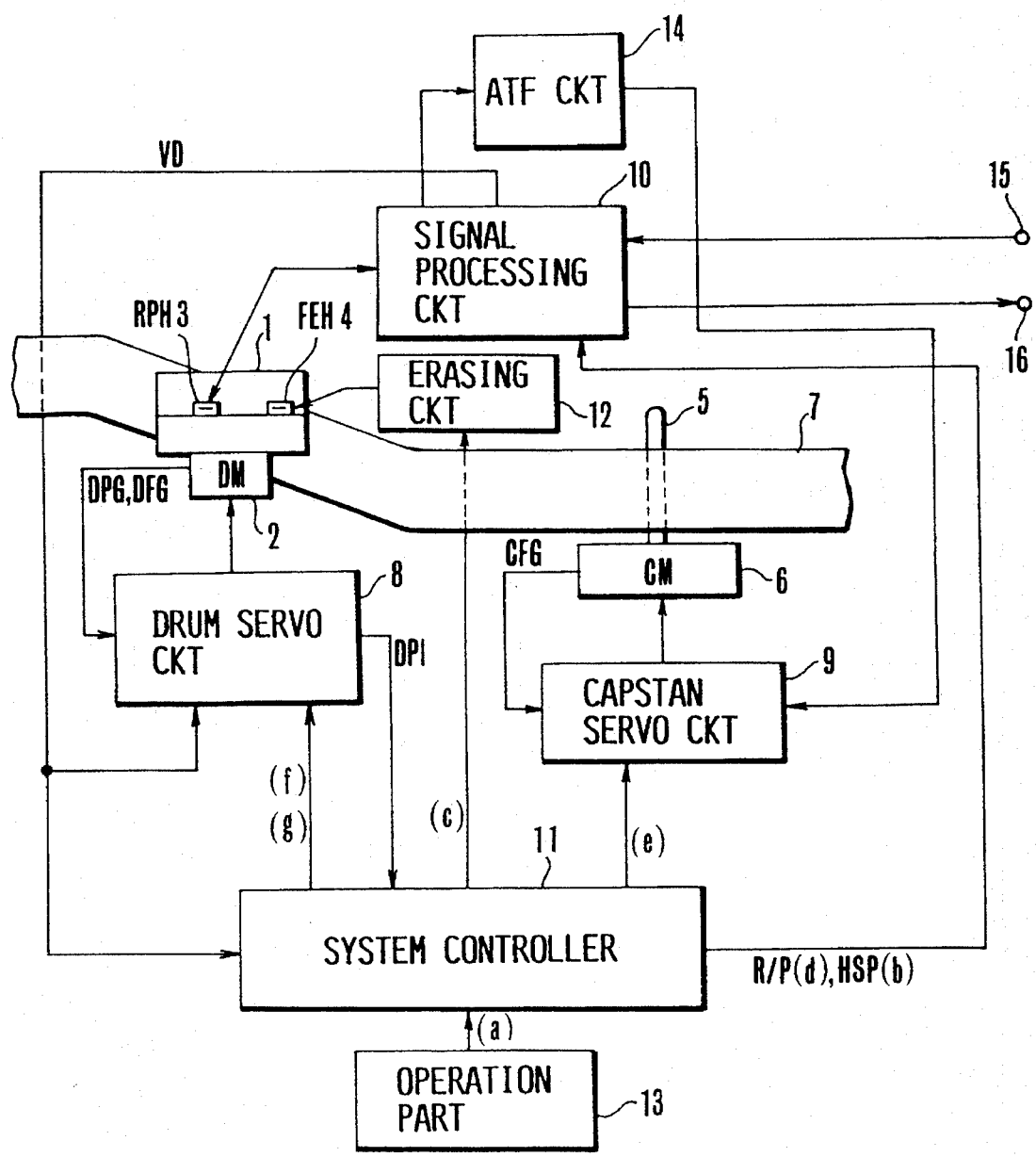
FIG. 2 shows in outline the arrangement of a VTR arranged according to this invention.

The following describes an embodiment of this invention: FIG. 2 is a block diagram showing in outline the arrangement of a VTR embodying this invention. The illustration includes a rotary drum 1; a drum rotating motor (DM) 2; a recording/reproducing rotary head (RPH) 3; a rotary erasing head (FEH) 4; a capstan 5 which is provided for moving a magnetic tape 7; and a capstan motor (CM) 6. A drum servo circuit 8 is arranged to control the drum motor 2 in accordance with a drum rotation speed detection signal DFG and a drum rotation phase detection signal DPG. A capstan servo circuit 9 is arranged to control the capstan motor 6 in accordance with a capstan rotation speed detection signal CFG. A signal processing circuit 10 is arranged to process a recording signal or a reproduced signal. A reference numeral 11 denotes a system controller and a numeral 12 an erasing circuit. An operation part 13 is provided for a key input which designates a mode of the system. An ATF circuit 14 is arranged to form a tracking control signal.

Referring to FIG. 2, the operation in a recording mode of the VTR is described as follows: The tape 7 is wrapped at a given angle around the drum 1. A recording signal recorded on the tape 7 is erased by the rotary erasing head 4 which is arranged to trace the tape ahead of the recording/reproducing head 3. After the erasion of the record, the head 3 records on the tape 7 a recording signal which is supplied from a terminal 15 through the signal processing circuit 10 and which includes a video signal, an audio signal and a tracking pilot signal. Video tracks are thus formed on the tape 7 at intervals of a given distance. In the meantime, the capstan 5 continues to move the tape 7 at a given constant speed. The drum servo circuit 8 causes the recording/reproducing head 3 which is mounted on the drum 1 to revolve at a constant given speed while retaining a specified phasic relation to the vertical synchronizing (hereinafter abbreviated to sync) signal VD of the video signal to be recorded.

The operation in a reproducing mode of the VTR is described as follows: The head 3 reproduces an RF signal, including a video signal and an audio signal. The video and audio signals are demodulated by the signal processing circuit 10. The demodulated signals are output from a terminal 16. The above-stated tracking pilot signal which is also reproduced is supplied to the ATF circuit 14. The ATF circuit 14 then produces a tracking error signal. The tracking error signal is supplied to the capstan servo circuit 9 to be used for a tracking control action to be performed by means of the capstan 5. During the period of the tracking control action, the drum servo circuit 8 causes the drum 1 to rotate at a given constant speed. In each of the various modes of the system, each part of the system is under the control of the system controller 11 which includes a microcomputer and is arranged to perform the control in accordance with an instruction received from the operation part 13. Among the parts of the system, the drum servo circuit 8 and the capstan servo circuit 9 closely exchange information with the system controller 11 including information on a start, a stop, the direction, the speed and the phase of the rotation of the drum motor 1, those of the capstan motor 6 and also information about the recording and reproducing modes.

Figure 3:
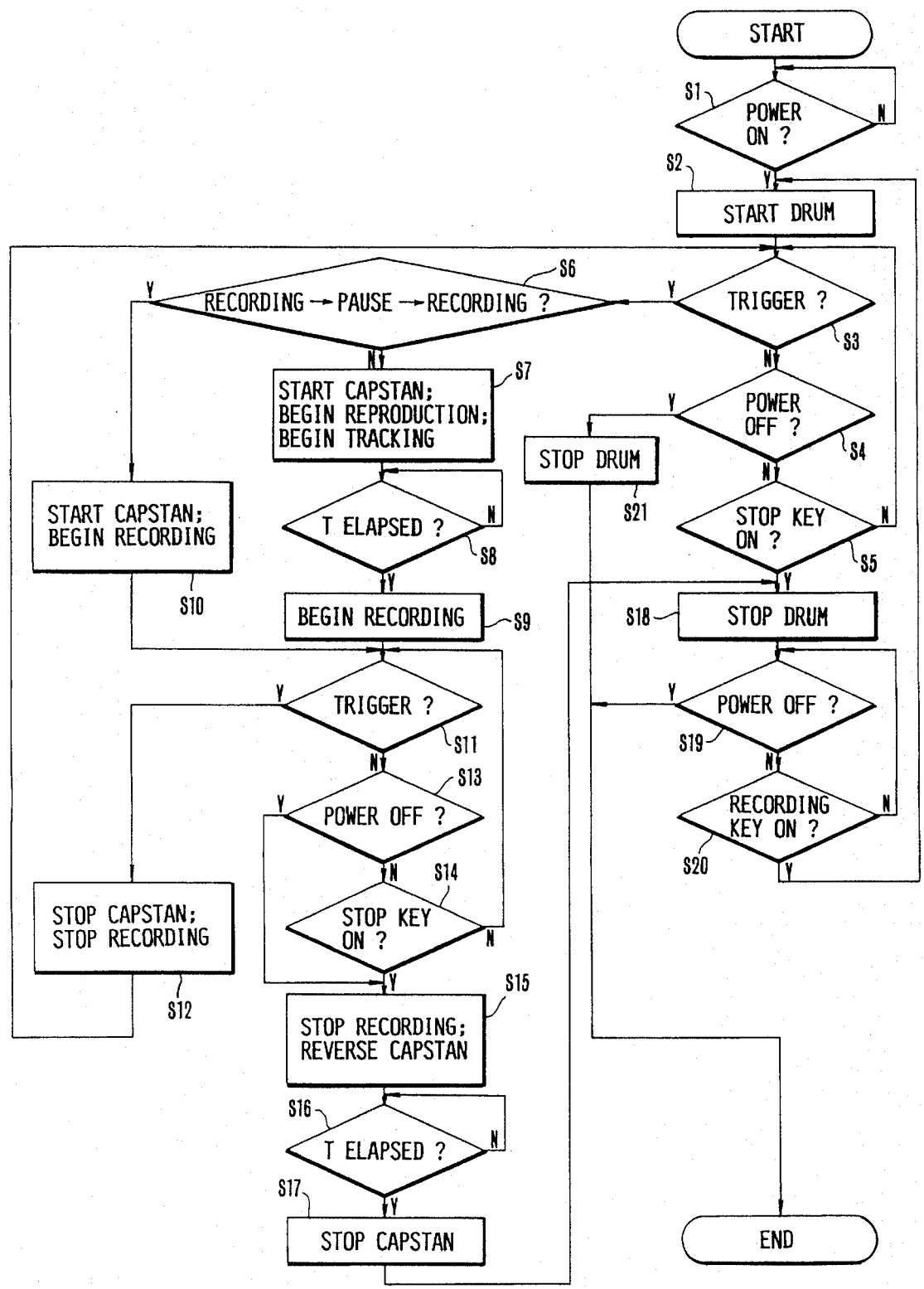
FIG. 3 is a flow chart showing the joined shooting action of the VTR of this invention.

Referring to FIG. 3 which is a flow chart, the joined shooting operation of the VTR is described as follows: A power supply switch is assumed to be turned on at a step S1. The drum 1 begins to rotate at a step S2. Then, the VTR comes into a recording pause mode. The mode of the VTR shifts to a recording mode when a trigger switch is turned on in the recording pause mode. In the case of this embodiment, however, a manner in which the VTR shifts to the recording mode varies according to how it has shifted to the recording pause mode. The mode shifting manner is determined at a step S6.

In a case where the recording pause mode is found to have been obtained with the trigger switch turned on when the VTR is in the recording mode, the flow of operation comes to a step S10. At the step S10: The rotation of the capstan is caused to begin at the same time as the start of recording as will be described in detail later. If the recording pause mode is found at the step S6 to have been obtained with a recording button of the operation part 13 turned on while the power supply switch is in an on-state or in a stop mode, the flow comes to a step S7. At the step S7: The capstan 5 is started and the ATF circuit 14 begins to perform tracking control while the head is caused to reproduce the recorded signal. At steps S8 and S9: Recording begins after the lapse of a given period of time T.

When the trigger switch is turned on in the recording mode at a step S11, the recording action and the rotation of the capstan are brought to a stop at the same time at a step S12. The VTR then comes back to the recording pause mode. In this instance, if the trigger switch is again turned on, the flow comes to the step S10. Meanwhile, if the power supply switch is turned off in the recording mode at a step S13 or if the stop key of the operation part 13 is turned on at a step S14, the recording action is brought to a stop and the rotating direction of the capstan is reversed at a step S15. At a step S16: The tape is rewound until the lapse of a given period of time. At a step S17: The rotation of the capstan is brought to a stop. At a step S18: The rotation of the drum is brought to a stop. This brings the VTR into the stop mode. At a step S20: When the recording key is turned on in the stop mode, the VTR comes back to the recording pause mode. If the trigger switch is again turned on in that instance, the flow comes to the step S7.

In a case where the power supply switch is found at the step S13 to be turned off in the recording mode, the rotation of the drum is brought to a stop at the step S18. After that, the flow comes to a step S19 to confirm the off-state of the power supply switch and the process of the flow comes to an end in the same manner as in the case where the power supply switch is turned off in the stop mode. Meanwhile, if the power supply switch is turned off in the recording pause mode, the flow comes to an end after the rotation of the drum is brought to a stop at a step S21. Then, if the trigger switch is turned on after the recording pause mode is obtained with the power supply switch again turned on at the step S1, the flow shifts to the step S7.

As apparent from the above description, in restarting a recording action after a pause of recording, the VTR of this invention shifts from the recording mode to the recording pause mode. If, in that instance, the VTR is to be shifted further to the recording mode, the period of recording pause can be considered short. In that case, therefore, the VTR is capable of promptly restarting its recording action without rewinding the tape. Hereinafter this mode is referred to as a first mode. In a case where the VTR is to be temporarily brought into a stop mode or the power supply switch is to be turned off, the tape is rewound. The rotation of the drum is brought to a stop. Then, in resuming the recording action, the tape is transported in the reproduction mode for a given period of time under the tracking control before the restart of recording. Hereinafter, this will be referred to as a second mode.

Figure 1:
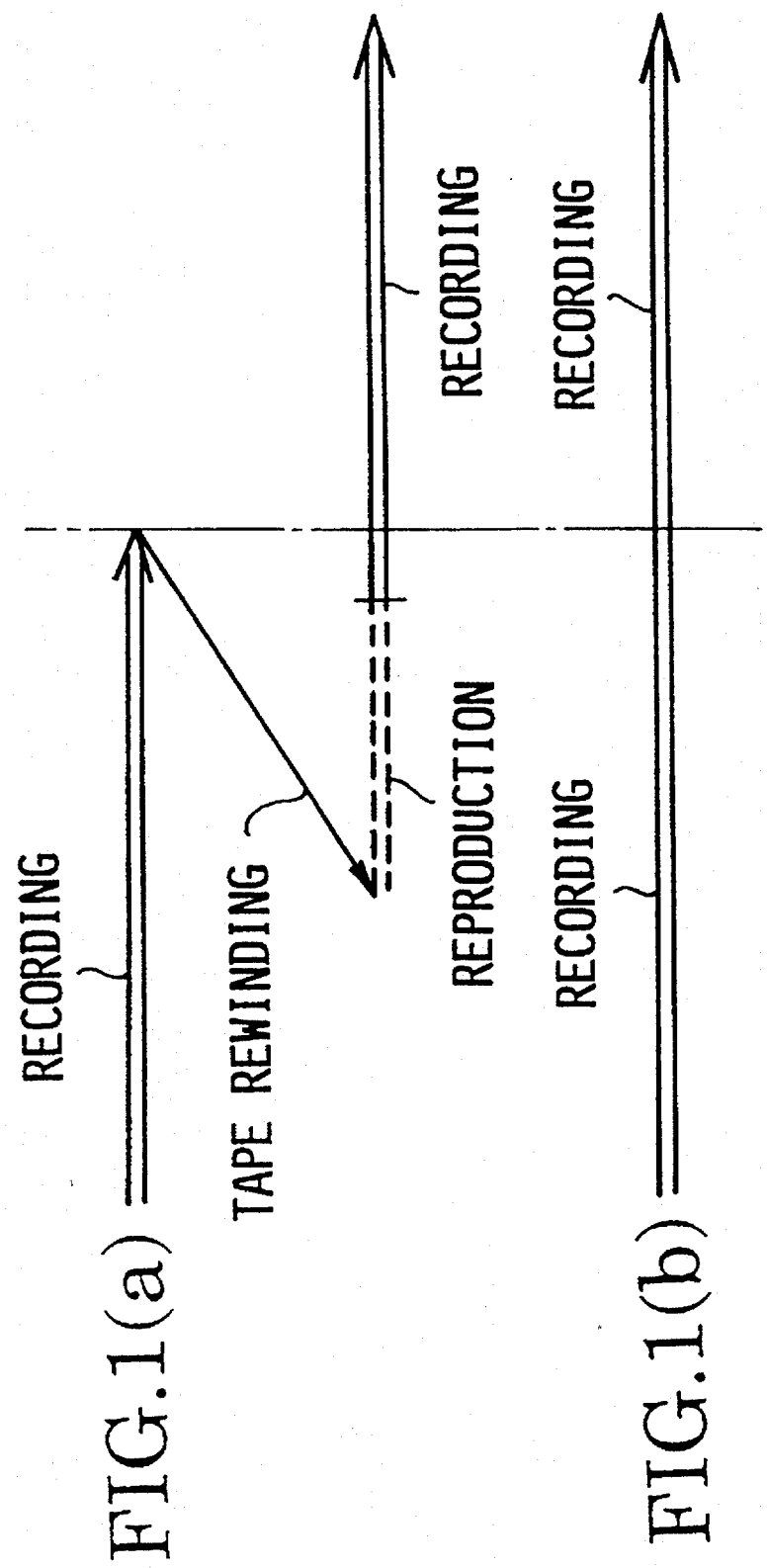
FIG. 1(a) and 1(b) schematically show the movement of a tape-shaped recording medium caused by a joined shooting action of the conventional apparatus and that of the invented apparatus respectively.
Figure 4:
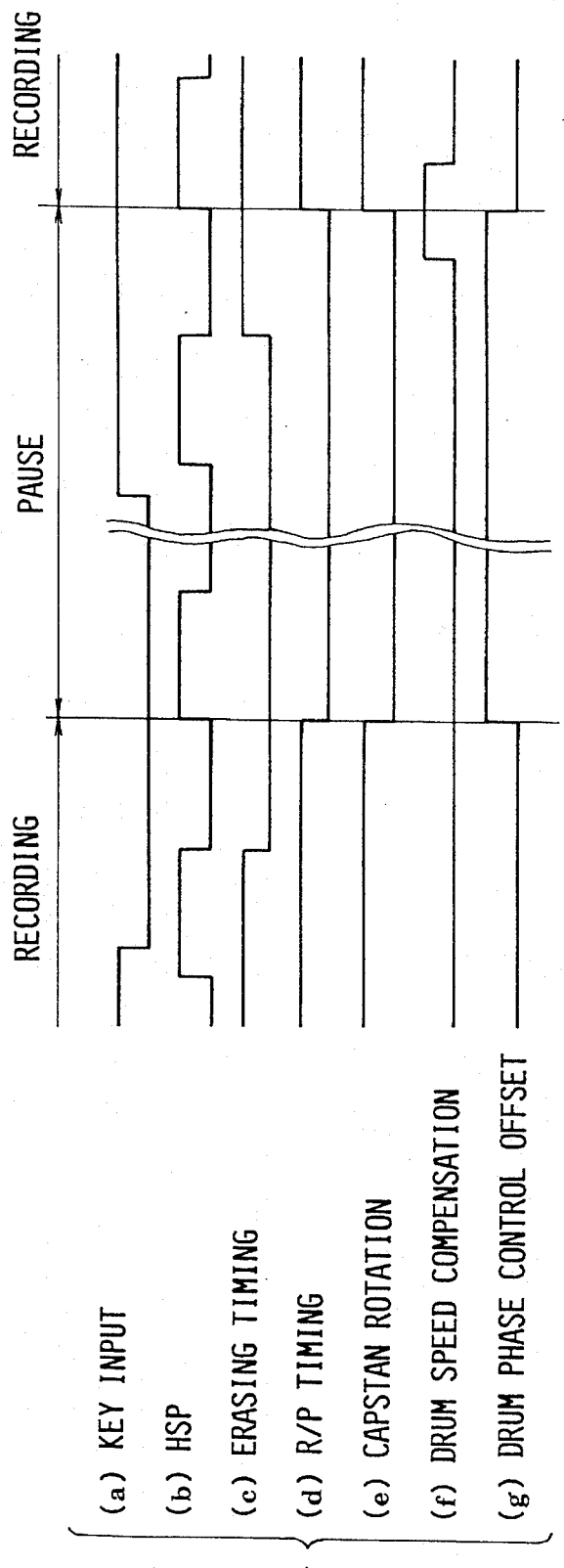
FIG. 4 is a timing chart showing the actions of various parts of the VTR shown in FIG. 2.

The latter method (or the second mode) is the known method as has been described in the foregoing and, therefore, requires no further description. The manner in which the tape is to be transported and the shift of mode are illustrated as shown in FIG. 1(a). The details of the former method (or the first method) are as described below:

FIG. 4 is a timing chart showing the actions of various parts of FIG. 2 performed at the time of the joined shooting in accordance with the former method.

Referring to the timing chart of FIG. 4, a part (a) of FIG. 4 shows a recording instruction signal coming from the operation part 13. A part (b) shows a head switching pulse signal HSP produced for the purpose of switching one recording/reproducing head over to another among a plurality of recording/reproducing heads 3 according to the rotation of the drum 1. A part (c) shows a timing signal which is produced for the purpose of actuating the rotary erasing head 4. A part (d) shows a timing signal for setting the VTR into the recording mode by supplying a recording current to the recording/reproducing head 3 or for switching the recording mode over to the reproducing mode. A part (e) shows a control timing signal for rotating the capstan 5 or stopping its rotation. A part (f) shows a drum speed compensation timing signal for changing the rotating speed of the drum 1 for a given period of time. A part (g) shows a drum phase control offset signal for varying a target phase value from one value over to another in performing phase control over a difference in phase between the drum 1 and the vertical sync signal of the video signal to be recorded.

The features of this embodiment reside in the following points: The recording timing signal (d) and the capstan rotation timing signal (e) are switched substantially at the same time in synchronism with the signal HSP which is generated according to the rotation of the drum. The timing at which the recording state of the VTR is shifted to the pause state thereof and the timing at which the pause mode is shifted to the recording mode are set at about the same timing as the phase of the signal HSP. Meanwhile, the drum servo circuit 8 of course acts to keep the phase relation between the vertical sync signal and the signal DPG unvarying, and the pinch roller is kept in a state of being pushed against the capstan 5.

The above-stated operation permits the joined shooting to be adequately performed without causing such problems as leaving an unrecorded part at a joint part between records and incontinuity of the video signal. This minimizes the length of time wasted.

Figure 5:
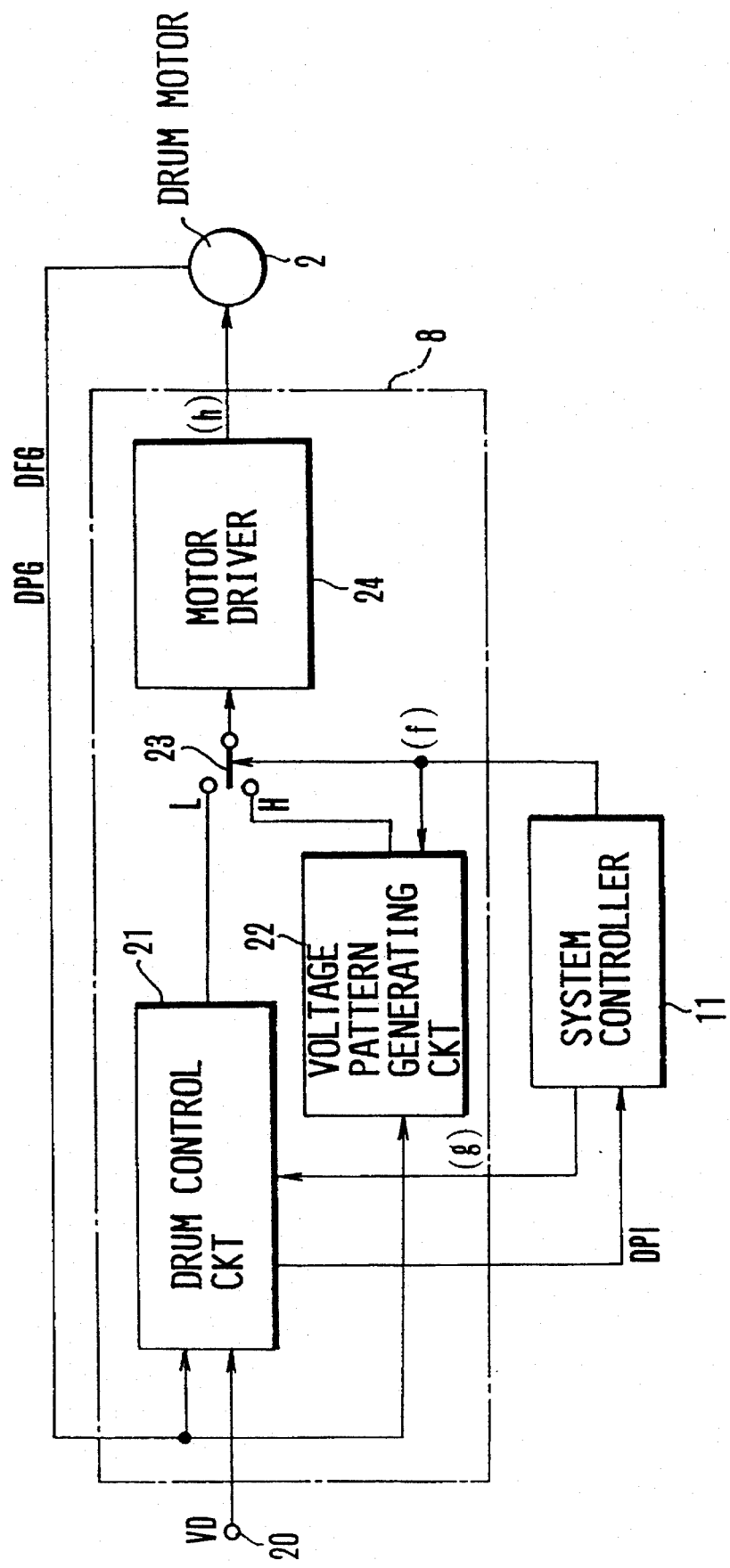
FIG. 5 is a diagram showing in detail the arrangement of a drum servo system of the VTR of FIG. 2.
Figure 6:
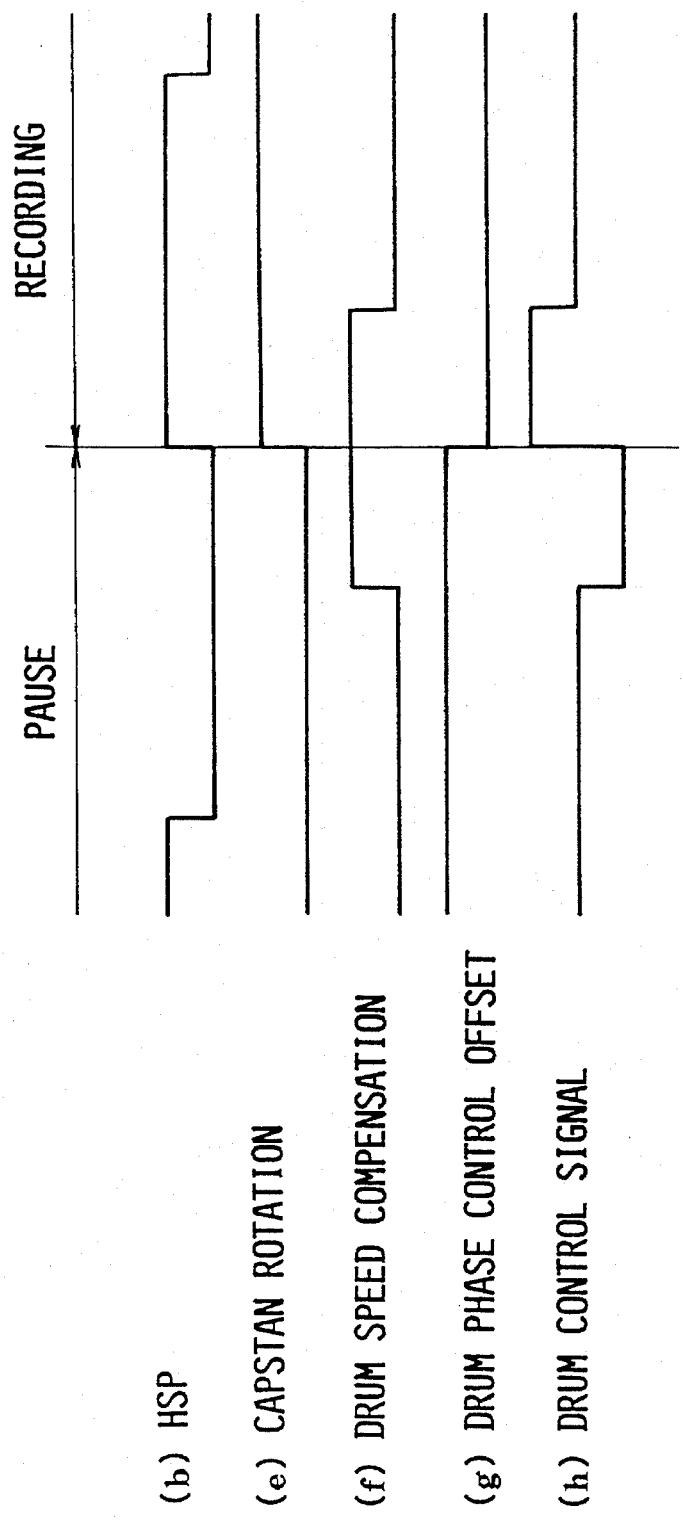
FIG. 6 is a timing chart showing the action of the same drum servo system performed when the state of the same VTR shifts from a pause state to a recording state.

Further, if the rotating speed of the drum 1 is kept unvarying in carrying out the joined shooting, the speeds of the tape and the video head relative to each other vary since the capstan 5 starts rotating at the same time as the start of recording by the head when the pause mode is shifted to the recording mode. Therefore, at the time of reproduction, the change in the relative speed might cause some lateral deviation to occur on the picture plane at this point. This embodiment is arranged to solve this problem in a manner as described in detail below:

FIG. 5 shows the details of arrangement of the drum servo system of the VTR shown in FIG. 2. FIG. 6 is a timing chart showing the operation of the VTR performed in shifting from the pause mode to the recording mode.

In FIG. 5, the inside of a block 8 encompassed with a one-dot chain line corresponds to the drum servo circuit 8 of FIG. 2. A drum control circuit 21 is arranged to generate a control signal for causing the drum motor 2 to rotate at a given speed and at a given phase in accordance with the vertical sync signal which comes from a terminal 20 and the signals DPG and DFG. A voltage pattern generating circuit 22 is arranged to generate a control voltage pattern for accelerating or decelerating the rotation of the drum 1 in a manner as will be described later herein. A reference numeral 23 denotes a changeover switch and a numeral 24 a drum motor driver.

If the rotating speed of the drum 1 is arranged to be unvarying, as mentioned above, the relative speed of the tape 7 and the recording/reproducing head 3 gradually decreases from a speed higher than a normal speed before it becomes the normal speed when the recording start timing and the capstan start timing are caused to coincide with each other, because: In the case of this embodiment, the drum rotating direction and the tape travel direction of the VTR are assumed to have vector components in the same direction. Therefore, to compensate for this, accelerating and decelerating pulse voltage signals are applied one after another as indicated by a drum control signal (h) in FIG. 6 during a given period of time before and after the start of the capstan 5 in accordance with the drum speed compensation timing signal (f) which is shown in FIGS. 4 and 6. This effectively cancels the above-stated relative speed change which takes place at the time of start of the capstan. More specifically, the system controller 11 is arranged to supply the speed compensation timing signal (f) to the voltage pattern generating circuit 22 and the switch 23. This causes the position of the switch 23 to be on one side H thereof during the above-stated given period of time. During this period, the output of the voltage pattern generating circuit 22 is supplied to the motor driver 24.

Further, the system controller 11 is arranged to prevent the rotation phase of the drum 1 from being caused to deviate by the above-stated speed compensating action. For this purpose, the system controller 11 supplies the drum phase control offset signal (g) to the drum control circuit 21 to set the rotation phase of the drum 1 relative to the vertical sync signal at a phase differing from its normal recording phase under the recording pause condition. In the case of this embodiment, as mentioned above, the rotating direction of the recording/reproducing head 3 and the direction in which the tape 1 is to be transported during the process of recording are assumed to have vector components in the same direction. On this assumption, the rotating speed of the drum 1 is lowered immediately before the start of the capstan 5 and is increased immediately after the start of the capstan 5. The rotation phase of the drum 1 is thus delayed at the time of the start of the capstan 5. Therefore, the drum control circuit 21 acts to cause the rotation phase of the drum 1 to be ahead of its normal recording phase under the pause condition and to bring the phase to the normal rotation phase after the start of recording.

The above-stated arrangement effectively prevents the drum servo circuit 8 from becoming unstable following the phase change of the drum 1 which results from the relative speed compensating action.

Further, in the case of this embodiment, as mentioned above, the stop and start timing of recording and the stop and start timing of the capstan are arranged to be changed almost at the same time. However, the relation between these timing points can be determined in consideration of the actual transient responsivity of the capstan. For example, the joined shooting can be accomplished more adequately by setting the capstan stopping and starting timing to be somewhat earlier than the recording stopping and starting timing.

The embodiment is arranged, as mentioned in the foregoing, to be capable of adequately carrying out the joined shooting even if the drum rotation is brought to a stop in the event of a long pause of recording. Therefore, the rotation of the drum can be stopped in cases where recording makes a long pause. This is an advantage in terms of electric energy consumption. In the event of a short pause of recording, the tape does not have to be rewound to save time from being wasted. The length of time required after a pause of recording and before a restart of recording can be shortened. Then, since the tape can be saved from being unnecessarily moved, the electric energy consumption can be saved also in the event of a short pause.

Further, in the embodiment described, the drum servo circuit and the capstan servo circuit are arranged separately from the system controller. However, it has recently become possible to arrange a one-chip microcomputer to be capable of performing these three functions. The use of such a one-chip microcomputer for these control functions furthers the advantage of the invention.

As described in the foregoing, the rotary head type recording apparatus arranged according to this invention is capable of shortening the period of time required between a pause of recording and a restart of recording and adequately accomplishing the joined shooting without causing any disturbance in the track pattern at a joint part between records.

Another advantage of the embodiment lies in that the action of the apparatus to be performed during the period of time after a pause of recording and before a restart of recording is selectable according to the manner in which the apparatus is being used. Therefore, the embodiment operates most appositely to its usage.

What is claimed is:

1. A rotary head type recording apparatus, comprising:
a) head means including a rotary head which records signals on a tape-shaped recording medium by tracing said medium and head driving means which rotates the rotary head;
b) transport means for transporting said tape-shaped recording medium in its longitudinal direction;
c) recording means for recording a recording signal on said recording medium by supplying said recording signal to said rotary head; and
d) control means for controlling said transport means and said recording means, according to an operation condition of said head means in case that said recording means stops a recording action performed on said recording signal and after that said recording means restarts said recording action, said control means having a first control mode in which said head driving means rotates the rotary head, said transport means stops a regular transporting action transporting said recording medium in a regular direction and said recording means stops said recording action and after that said transport means restarts said regular transporting action without reversing a direction in which said recording medium is transported and said recording means restarts said recording action, and a second control mode in which said head driving means stops said rotating action, said recording means stops said recording action and said transport means stops said regular transporting action and performs a reverse transporting action transporting said recording medium in a reverse direction of said regular direction for a predetermined period of time and after that said head driving means restarts said rotation action, said recording means restarts said recording action and said transport means restarts said regular transporting action.

2. An apparatus according to claim 1, wherein, in said first control mode, said control means synchronizes a timing of restarting said recording action performed on said recording signal and a timing of restarting said regular transporting action performed on said tape-shaped recording medium with a timing that a rotation phase of said rotary head reaches at a predetermined phase.

3. An apparatus according to claim 2, wherein said control means is arranged to synchronize, in said first control mode, a timing of stopping said recording action performed on said recording signal by said recording means and a timing of stopping said regular transporting action with a timing that the rotation phase of said rotary head reaches at said predetermined phase.

4. An apparatus according to claim 1, further comprising tracking control means for controlling the position of said rotary head relative to tracks formed on said tape-shaped recording medium by using a signal recorded on said recording medium, and wherein said control means, in said second control mode, causes said tracking control means to operate from restarting said regular transporting action to restarting said recording action.

5. An apparatus according to claim 1, further comprising operation means for instructing the recording means to record the signal, said recording means performing the recording operation according to an instruction of the operation means and wherein said control means, in said first control mode, controls said head driving means to make a rotation speed of said rotary head slower than a regular speed in a first period immediately before restarting said recording action and to make the rotation speed faster than the regular speed in a second period immediately after restarting said recording action and to make the rotation speed the regular speed before the first period and after the second period and, in said second control mode, controls said head driving means to make the rotation speed of said rotary head constant even for a predetermined period of time immediately before and immediately after the restarting said recording action.

6. An apparatus according to claim 1, wherein said control means switches the transportating operation of the transportation means and the recording operation of the recording means substantially simultaneously in the first mode.

7. An apparatus according to claim 6, further comprising: generating means for generating a signal indicating the rotation phase of the rotary head wherein said control means effects the switching operation in synchronism with the signal indicating the rotation phase of the rotary head.

8. A recording apparatus, comprising:
(a) recording means for recording a video signal on a recording medium, said recording means including a rotary head;
(b) transfer means for transferring said recording medium; and
(c) control means for controlling said recording means and said transfer means according to operation condition of said rotary head in case that said recording means stops a recording operation performed on the video signal and after that said recording means restarts said recording operation, said control means being able to assume a first condition under which said rotary head rotates, said transfer means stops said recording medium at a first position near a predetermined position corresponding to the stop of recording operation of said recording means and said recording means stops said recording operation and after that said transfer means restarts to transfer said recording medium in a regular direction and said recording means restarts said recording operation, and a second condition under which said rotary head stops and said transfer means stops said recording medium, performs a reverse transfer action transferring said recording medium in a reverse direction of the regular direction for a predetermined period of time and stops said recording medium at a second position more distant from said predetermined position than the first position and after than said rotary head restarts to rotate, said recording means restarts said recording operation and said transfer means restarts to transfer said recording medium in the regular direction.

9. An apparatus according to claim 8, wherein said recording means records the video signal on the recording medium transferred by said transfer means.

10. An apparatus according to claim 8, wherein said first position is substantially the same as said predetermined position and said second position is more distant from said predetermined position than said first position in a direction reverse to a regular transfer direction of said transfer means.

11. An apparatus according to claim 10, wherein said control means restarts the transfer operation of said recording medium in a direction of a regular transfer from said first position and restarts the recording operation after assuming said first condition, and restarts the transfer operation of said recording medium in the regular transfer direction from said second position and restarts the recording operation by rotating the rotary head after assuming said second condition.

12. A rotary head type recording apparatus, comprising:

a) a rotary head which records signals on a tape-shaped recording medium by tracing said medium;

b) transport means for transporting said tape-shaped recording medium in its longitudinal direction;

c) recording means for causing a recording signal to be recorded on said recording medium by supplying said recording signal to said rotary head;

d) generating means for generating a signal indicating a rotating phase of said rotary head; and e) control means for controlling said transport means and said recording means, said control means having a quick recording mode in which said transport means stops a regular transporting action transporting said recording medium in a regular direction and said recording means stops a recording action performed on said recording signal and after that said transporting means restarts said regular transporting action without reversing a direction in which said recording medium is transported and said recording means restarts said recording action, said control means synchronizing a timing of stopping and restarting said recording action with a timing that the rotation phase of said rotary head indicated by the signal generated by said generating means reaches a predetermined phase.

13. A recording apparatus, comprising:

(a) a rotary head for tracing a tape-shaped recording medium to record signals on the medium;

(b) transport means for transporting said tape-shaped recording medium in its longitudinal direction;

(c) recording means for recording a recording signal on said recording medium by supplying said recording signal to said rotary head;

(d) instruction means having a first instructing member and a second instructing member; and (e) control means for selecting a control mode from among plural modes according to the instruction of said instruction means when said recording means stops the recording operation and subsequently restarts the recording operation, said plural modes including a first control mode in which said transport means stops a regular transporting action transporting said recording medium in a regular direction and said recording means stops said recording action and after that said transport means restarts said regular transporting action without reversing a direction in which said recording medium is transported and said recording means restarts said recording action, and a second control mode in which said recording means stops said recording action and said transport means stops said regular transporting action and performs a reverse transporting action transporting said recording medium in a reverse direction of said regular direction for a predetermined period of time and after that said recording means restarts said recording action and said transport means restarts said regular transporting action, said control means selects a first control mode in response to the instruction by said first instructing member and selects a second control mode in response to the instruction by said second instruction member, said control means controls a timing of stopping and a timing of restarting so that both of the timings correspond to a timing that the rotation phase of said rotary head indicated by the signal generated by said generating means reaches a predetermined phase in said first mode.

14. An apparatus according to claim 13, further comprising head drive means for rotating said rotary head, wherein said head drive means maintains the rotating action of the rotary head in said first control mode, and stops the rotation of the rotary head in correspondence to the stop of the recording action and restarts the rotation of said rotary head in correspondence to the restart of the recording action in said second control mode.

15. An apparatus according to claim 14, wherein, in said first control mode, said control means synchronizes a timing of restarting said recording action performed on said recording signal and a timing of restarting said regular transporting action performed on said tape-shaped recording medium with a timing that a rotation phase of said rotary head reaches at a predetermined phase.

16. An apparatus according to claim 14, wherein said control means is arranged to synchronize, in said first control mode, a timing of pausing said recording action performed on said recording signal by said recording means and a timing of pausing said regular transporting action with a timing that the rotation phase of said rotary head reaches at said predetermined phase.

17. An apparatus according to claim 14, further comprising tracking control means for controlling the position of said rotary head relative to tracks formed on said tape-shaped recording medium by using a signal recorded on said recording medium, and wherein said control means, in said second control mode, causes said tracking control means to operate from restarting said regular transporting action to restarting said recording action.

18. An apparatus according to claim 14, further comprising operation means for instructing the recording means to record the signal, said recording means performing the recording operation according to an instruction of the operation means and wherein said control means, in said first control mode, controls said head driving means to make a rotation speed of said rotary head slower than a regular speed in a first period immediately before restarting said recording action and to make the rotation speed faster than the regular speed in a second period immediately after restarting said recording action and to make the rotation speed the regular speed before the first period and after the second mode and, in said second control mode, controls said head driving means to make the rotation speed of said rotary head constant even for a predetermined period of time immediately before and immediately after the restarting said recording action.

19. A recording apparatus, comprising:
   (a) recording means for recording a video signal on a recording medium, said recording means including a rotary head;
   (b) transporting means for transporting the tape-shaped recording medium;
   (c) generating means for generating a signal indicating a rotating phase of said rotary head; and
   (d) control means for controlling said recording means and said transporting means according to an operation condition of the apparatus, said control means having, in case that said recording means pauses a recording action performed on said recording signal and after that said recording means restarts said recording action, a first control mode in which said transport means stops a regular transporting action transporting said recording medium in a regular direction and said recording means stops said recording action and after that said transport means restarts said regular transporting action without reversing a direction in which said recording medium is transported and said recording means restarts said recording action, and a second control mode in which said recording means stops said recording action and said transport means stops said regular transporting action and performs a reverse transporting action transporting said recording medium in a reverse direction of said regular direction for a predetermined period of time and after that said recording means restarts said recording action and said transport means restarts said regular transporting action, said control means controls a timing of stopping and a timing of restarting so that both of the timings correspond to a timing that the rotation phase of said rotary head indicated by the signal generated by said generating means reaches a predetermined phase in said first control mode.

* * * * *

UNITED STATES PATENT AND TRADEMARK OFFICE
CERTIFICATE OF CORRECTION

PATENT NO. : 5,615,062
DATED : March 25, 1997
INVENTOR(S) : Takayama, Nobutoshi

It is certified that error appears in the above-identified patent and that said Letters Patent is hereby corrected as shown below:

Title Page, Item [57] Abstract, line 1, delete "comprises" and insert -- having --.

Col 1, line 64, delete "Oases" and insert -- cases --.

Signed and Sealed this

Ninth Day of June, 1998

BRUCE LEHMAN

Attest:

Attesting Officer

Commissioner of Patents and Trademarks